United States Patent [19]

Hayes et al.

[11] Patent Number: 5,210,787

[45] Date of Patent: May 11, 1993

[54] SUBSCRIBER INTERROGATION POINT

[75] Inventors: John Hayes, St. Laurent, Quebec, Canada; Glen H. Schmid, Dusseldorf, Fed. Rep. of Germany

[73] Assignee: Telefonaktiebolaget L M Ericsson, Sweden

[21] Appl. No.: 651,297

[22] Filed: Feb. 5, 1991

[51] Int. Cl.⁵ .......................................... H04M 11/00
[52] U.S. Cl. ........................................ 379/60; 379/59; 455/33.2
[58] Field of Search ....................... 379/58, 59, 60, 63; 455/33.1, 33.2

[56] References Cited

U.S. PATENT DOCUMENTS

| | | | |
|---|---|---|---|
| 3,663,762 | 5/1972 | Joel, Jr. ................. | 179/41 A |
| 3,906,166 | 9/1975 | Cooper et al. .......... | 179/41 A |
| 4,112,257 | 9/1978 | Frost ..................... | 179/2 EB |
| 4,398,063 | 8/1983 | Hass et al. .............. | 179/2 EB |
| 4,698,839 | 10/1987 | DeVaney et al. ....... | 379/60 |
| 4,700,374 | 10/1987 | Bini ....................... | 379/60 |
| 4,726,014 | 2/1988 | Goldman et al. ....... | 370/58 |
| 4,742,560 | 5/1988 | Kanji ..................... | 455/33 |
| 4,833,701 | 5/1989 | Comroe et al. ......... | 455/33.2 |
| 4,833,702 | 5/1989 | Shitara et al. .......... | 379/60 |
| 4,852,148 | 7/1989 | Shibata et al. .......... | 379/59 |
| 4,876,738 | 10/1989 | Selby ..................... | 455/33 |
| 4,901,340 | 2/1990 | Parker et al. ........... | 455/33.1 |
| 5,018,187 | 5/1991 | Marinho et al. ........ | 370/60 |

OTHER PUBLICATIONS

Straw Man for Automatic Roaming, Electronic Industries Association, Jun. 1985.

*Primary Examiner*—Curtis Kuntz
*Assistant Examiner*—George J. Oehling
*Attorney, Agent, or Firm*—Johnson & Gibbs

[57] ABSTRACT

In a cellular radio communications network a plurality of mobile switching centers have data access to a subscriber interrogation point which maintains a database identifying the home exchange of a plurality of mobile stations, the home exchanges of which are within a given region. When a roaming mobile subscriber seeks to register with a visited exchange, that exchange contacts a subscriber interrogation point identified in its own database as being associated with the roaming mobile in order to locate within the database of the subscriber interrogation point the home exchange of the mobile seeking to register. Maintenance of the home exchange identification information in the database of a subscriber interrogation point, rather than in the database of each potentially visited exchange, greatly simplifies database maintenance when the home exchange of a mobile station is changed.

21 Claims, 3 Drawing Sheets

SUBSCRIBER INTERROGATION POINT

BACKGROUND OF THE INVENTION

1. Field of the Invention

The invention relates to cellular mobile radio system networks and, more particularly, the routing of messages for roaming mobile subscribers within such networks.

2. History of the Prior Art

The public telecommunication systems can be divided generally into two components; the public switched telephone network (PSTN) and the mobile subscriber network. The latter category consists of very many mobile telephone subscribers ("Mobiles") who remain in communication with one another and with telephones connected to the PSTN by virtue of radio links within a plurality of adjacent cells. Each cell is illuminated by the radio transmissions from a particular base station which covers that cell and which is in turn coupled to a mobile switching center ("MSC") which controls the radio linkages between many different base stations and their associated cells covering a given geographic area. Each cellular exchange or cellular system is made up of one or more MSCs and its associated base stations serving the mobiles within a particular geographic area. Mobile telephone systems are connected to the PSTN to enable mobile subscribers and land base subscribers to freely communicate with one another and are interconnected with one another in different geographic areas to comprise a network.

Each mobile subscriber is associated with a particular home MSC or home location register which maintains a record of all relevant information associated with that mobile including the type of telephone service and options it has selected to receive. For example, a home MSC will store a mobile subscriber's mobile identification number ("MIN") along with its electronic serial number identifying the particular mobile instrument; the categories of service for which it is contracted, e.g., whether it has call forwarding or call waiting or whether it may originate long distance calls to certain specific areas or not; and other subscriber specific information. When the mobile subscriber is operating within its own geographic area and calls to and from the mobile are being handled through the mobile's home MSC all of this information is readily available and used by the MSC in handling telephone traffic with the mobile. Another item of information stored in the home MSC in the mobile's record is the last known geographic location of the mobile. This information enables the home MSC to locate the mobile whenever it receives a call directed to the telephone number in the home MSC assigned to the mobile.

Each mobile within the network maintains contact with the radio communication system by means of a process known as registration. In the process of registration, each mobile periodically receives a signal from a base station including data which identifies the particular system with which the mobile is in radio contact, referred to as a system identification number ("SID") in North American cellular systems. The mobile in turn responds to the periodic signals from the system base station contained within an overhead message train, including the SID signal, by sending to the system its MIN and its electronic serial number for registration with it as a user. There are basically three ways in which a mobile may register: autonomous registration (in response to the mobile entering a new geographic area), periodic registration (in response to the passage of time since the last registration), and registration while originating a call from the mobile (in response to an unregistered mobile seeking to originate a call).

When a mobile travels from the geographic area covered by its home MSC, it is said to be "roaming." In such a situation, it is desirable to be able to still provide telephone service to the mobile both in response to the mobile originating a call to be connected either to another mobile in the network or to a subscriber on the PSTN or to a call being directed from another subscriber to the mobile. Thus, it is necessary to have a way in which the mobile can be tracked to any exchange within which it may be located in the network, known as a visited exchange, outside of its home exchange. This is done by a process of maintaining records within each exchange as to the identity of all roaming mobiles currently operating within that exchange as well as the current location of all mobiles for whom that exchange is the home exchange. These data are regularly communicated between the various MSCs comprising the cellular mobile system network. This information enables the providing of telephone service to a roaming mobile by assuring the visited exchange that the mobile is authorized to be making and receiving calls in the visited exchange and that it is financially responsible for those calls. This information also provides the home exchange with data on where the mobile is currently located so that calls may be delivered from outside of the visited exchange to the mobile within that exchange.

Prior art systems provide arrangements whereby each exchange stores enough of the MIN to identify the home exchange for each mobile within the entire network which might seek to register as a roaming visitor within that exchange. Each visited exchange will, upon registration by a roaming mobile within that exchange, consult information stored within its memory, known as a digit analysis table, to determine the home exchange of the mobile in order to be able to contact that home exchange to authenticate the mobile and to request data relating to the service parameters of the mobile. Thus, each MSC within the entire network of MSCs must maintain a detailed record related to all mobiles within the network enabling that MSC to locate the home exchange of every mobile operating within the network should that mobile register as a visitor within that exchange. While such a system enables the handling of calls and the providing of service to roaming mobile subscribers, it requires the frequent updating of mobile subscriber information within a large number of MSCs as that information changes. For example, in large metropolitan areas, such as Los Angeles, in which there are a large number of different MSCs serving as home exchanges to subscribers, there are frequent revisions and changes to the service areas of each MSC because of growth in the number of subscribers and the need to reassign certain subscribers to new MSCs as the efficient capacity of particular MSCs is reached. Thus, each time the subscription for a particular mobile is moved from one MSC to another, that changes its home MSC and requires that same information to be sent to every other MSC in the network as to the new home MSC of the mobile. It is a huge undertaking to regularly update and change the memory contents of every MSC in the network every time it is necessary to update the digit analysis table of that MSC in order to render it capable of handling registrations from a mobile the home exchange of which has been changed.

The system of the present invention provides an additional node within the mobile exchange network to facilitate the handling of call registration data within the network. The provision of subscriber interrogation points within a cellular mobile telecommunications exchange network in accordance with the system of the present invention greatly simplifies the maintenance of subscriber information within the network.

SUMMARY OF THE INVENTION

In one aspect the system of the present invention includes a cellular radio communications network having a plurality of mobile switching centers each having a plurality of base stations with which a mobile subscriber may be connected. A plurality of mobile switching centers serve as the home exchange for a plurality of mobile subscribers and store within the memory of each preselected information associated with each mobile subscriber for which it is the home exchange. A plurality of mobile switching centers serve as the visited exchange for a plurality of mobile subscribers for which each is not the home exchange and store within the memory of each preselected information associated with each mobile subscriber within the network capable of roaming into said visited exchange. A data network interconnects each of the mobile switching centers for the communications of information between them. A subscriber interrogation point is connected to the data network for communications with it and is associated with either other subscriber interrogation points or a group of mobile subscribers the home exchanges of which are located in a particular geographic area. The subscriber interrogation point has a memory containing information associated with each mobile subscriber identifying either the home exchange of that particular subscriber or other subscriber interrogation points able to identify such home exchange.

In another aspect the invention includes a method of supplying information to a visited exchange within a mobile radio communications network associated with a mobile subscriber roaming within the network. Data related to the service of each mobile subscriber and the last known geographic location of the subscriber is stored in memory in a home location associated with each mobile subscriber. Data related to the home location of a plurality of mobile subscribers is stored within a subscriber interrogation point. Data which identifies a subscriber interrogation point associated with each mobile subscriber within the network is stored within each exchange in the network. A location update request message addressed to the subscriber interrogation point associated with said visiting mobile is sent from a visited exchange in response to either a registration request or call initiation by a visiting mobile subscriber. A location update request message is forwarded from the subscriber interrogation point to the home location associated with the visiting mobile subscriber requesting registration with the visited exchange. Thereafter, the home exchange communicates directly with the visited exchange by means of the data network.

BRIEF DESCRIPTION OF THE DRAWINGS

For an understanding of the present invention and for further objects and advantages thereof, reference may be had to the following description taken in conjunction with the accompanying drawings in which.

DETAILED DESCRIPTION

As discussed above, in the prior art mobile telephone communication network each MSC is required to maintain within its digit analysis table information with regard to the home exchange of each mobile operating within the network and which could potentially be a visitor within that exchange. This requires frequent updating of every MSC in the entire network whenever the home exchange of any one mobile is changed, for example, due to reassignment of the subscription of that mobile to a new MSC due to the adding of switches within a metropolitan area or to the relocation of that mobile due to change in service loction. It should be understood that the term "home exchange" of a mobile includes not only the home MSC of that mobile, but also a home location register ("HLR") which may be either included as part of the home MSC or a regional register containing the subscriber identification information for one or more MSCs. Nevertheless, the maintenance of information related to the home exchange of a large number of mobiles can be a substantial, time consuming and expensive proposition.

Figure 1:
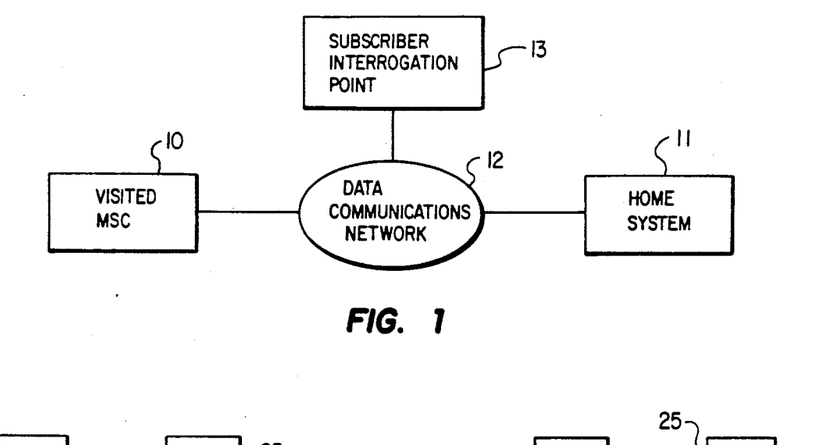
FIG. 1 is a block diagram of an interconnection between a home and a visited exchange including a subscriber interrogation point provided in accordance with the present invention.

The system of the present invention includes providing one additional level of analysis within the mobile communications network which has been termed, for purposes of explanation, a subscriber interrogation point ("SIP"). As shown in FIG. 1, a visited MSC 10 of a mobile is connected to the home system 11 of that mobile through the data communication network 12. Also connected into the data communication network 12 is a subscriber interrogation point 13 which is associated with the home exchange 10. Any request for information with regard to a roaming mobile seeking to register within the visited MSC 10 is routed directly to the subscriber interrogation point 13 which stores information relating to the home exchange of all of the mobiles within the network. The subscriber interrogation poont 13 simply provides the address of the home exchange to the update request sent by the visited exchange to the subscriber interrogation point and forwards it on to the home exchange 11. Thereafter, the home exchange 11 communicates directly with the visited exchange 10 via the data communications network 12 and the subscriber interrogation point 13 does not form part of the communication loop therebetween. Thus, the subscriber interrogation point 13 is provided simply to route roaming mobile information to the appropriate home exchange and to greatly simplify the updating of information as to the home exchange of every mobile within the system. Updating information for each mobile within the network need only be provided to the subscriber interrogation point 13 associated with the home exchange of that mobile rather than to each and every MSC within the network. As will be further seen, the subscriber interrogation point 13 may even provide the address of a more specific subscriber interrogation point within the network which will, in turn, provide the specific address of the home exchange.

Figure 2:
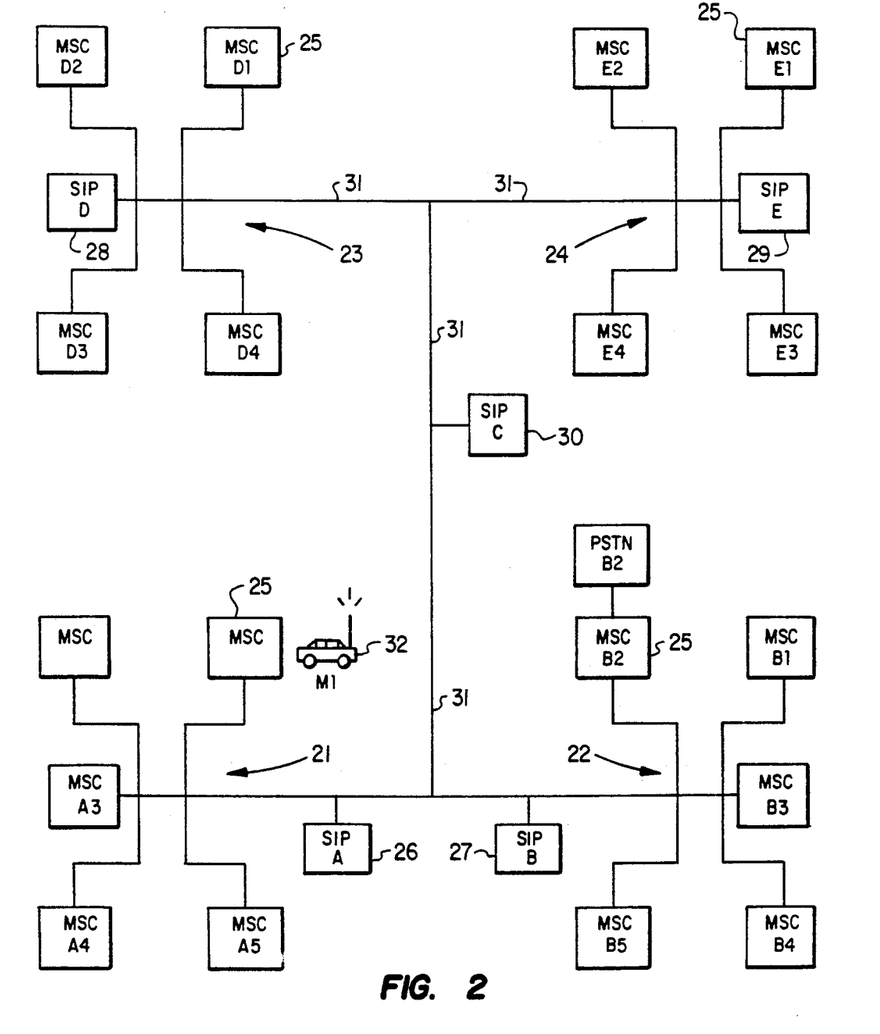
FIG. 2 is a block diagram of an illustrative arrangement of subscriber interrogation points within a cellular mobile exchange network in accordance with the system of the present invention.

Referring next to FIG. 2, there is shown a block diagram of a mobile cellular communications system network constructed in accordance with the teachings of the present invention. A plurality of regional cellular mobile systems 21-24, each of which comprise a plurality of MSCs 25 which are all connected to a regional subscriber interrogation point 26-29. For example, the regional system 21 includes MSCs A-1 through A-5 and may illustratively represent a portion of the Los Angeles cellular system, while the regional grouping 22, comprising MSCs B-1 through B-5 may illustratively represent a portion of the New York metropolitan cellular system. Similarly, the grouping 23 of MSCs, comprising MSCs D-1 through D-4 could illustratively represent a portion of the exchanges within the Toronto, Canada metropolitan region, while the geographic grouping 24, including MSCs E-1 through E-4, might illustratively represent the Montreal metropolitan region.

The regional grouping of MSCs A-1 through A-5 are each connected to a subscriber interrogation point 26 (SIP A) and are each also connected, along with the subscriber interrogation point A, to a data communication network 31. Similarly, the regional area 22, comprising MSCs B-1 through B-5 are each connected to a subscriber interrogation point 27 (SIP B) and are each connected, along with SIP B, to the data communication network 31. The regional grouping of MSCs 23, including MSC D-1 through D-4 are each connected to the data communication network 31 along with their associated regional subscriber interrogation point 28 (SIP D) and the regional grouping of MSCs E-1 through E-4 are each also connected to the data communication network 31 along with their associated regional subscriber interrogation point 29 (SIP E). The super-regional subscriber interrogation point 30 (SIP C) is associated with both regional MSCs 23 and 24 is also connected to the data communication network 31.

As discussed above, when a mobile 32 seeks to register as a visitor in exchange MSC A-1, that MSC will analyze the MIN of that mobile to determine two things:

(a) whether the subscriber is currently connected; and (b) the identity of the subscriber's home exchange. Visited exchange A-1 does this by going to its digit analysis table to find the home exchange of the mobile in order to perform three actions:

(a) update the geographic location of the mobile stored within its home exchange;

(b) authenticate the mobile as being capable of receiving service from the visited exchange; and (c) obtain information as to the detail service specifications which the visiting mobile subscriber is to receive.

When the mobile 32, the home exchange of which is assumed to be B-1, first seeks to register as a visitor within the exchange area 21 by sending a registration or call origination message to MSC A-1, MSC A-1 sends a validation/authentication location update request to the regional subscriber interrogation point SIP B associated with the home exchange of the mobile 32 via the data communication network 31. The subscriber interrogation point SIP B accesses the data stored within its memory to obtain from the MIN of the mobile requesting registration the home exchange of that mobile and then reroutes the update location request back onto the data communication network 31 but readdressed to the home exchange of the mobile. Thereafter, information is returned to the visited exchange MSC A-1 directly from the home exchange of the mobile, for example, MSC B-1, and thereafter direct data communication is maintained between the two MSCs via the data communication network 31.

In certain cases it may be desirable to further specify and divide information within a subscriber interrogation point. For example, it may be preferred that all location update requests having MINs from Canadian subscribers be routed to a Canadian subscriber interrogation point SIP C rather than directly to the subscriber interrogation points, SIP D and SIP E, associated with the Canadian home exchanges.

Upon receipt of the message by 30 (SIP C), the location update request message would in turn be rerouted directly to one of several Canadian SIPs, such as either 28 (SIP D) or 29 (SIP E), associated with the subscriber requesting registration. From either of those two SIPs the update request message concerning the subscriber requesting registration would be in turn routed on to the particular MSC which was the home exchange of the particular mobile.

Once the location update request message seeking information concerning a visiting subscriber attempting to register in the visited exchange 21 is received by either the home exchange or a home location register, the information is then communicated directly back to the visited exchange by means of the data network 31. Thereafter, any information exchange between the visited exchange and the home exchange occurs directly over the data network rather than through a subscriber interrogation point as is the case when the home exchange is first being interrogated by the visited exchange.

As can be seen from the operation of the system illustrated in FIG. 2, each of the exchanges in the network are no longer required to store the home location information for every subscriber operating within the network who could potentially become a visitor in that exchange. This eliminates the necessity of updating stored information within every possible visited exchange whenever the information regarding the home exchange of a particular subscriber within the network is changed, for example, in the case of the reassignment of particular subscribers to different switches within an exchange area. As illustrated in FIG. 2, the information identifying the home exchange address of all of the subscribers having a home exchange within the geographic area 21 is stored in SIP A and the home exchange address of all the subscribers located in the geographic area 22 is stored in SIP B. Similarly, the home location address of all subscribers having a home address in geographic area 23 are stored in SIP D while the home exchange address of all subscribers having a home exchange within geographic area 24 are stored in SIP E. As can be seen from FIG. 2, each of the subscriber interrogation points 26–30 are connected to the data network 31 so as to simply serve as a routing node for messages intended for either a home exchange (including a home location register) or another subscriber interrogation point within which the home location address of that particular subscriber would be found. This requires that only the subscriber interrogation point node address be stored in the individual digit analysis table within each of the exchanges in correspondence with all or a portion of the mobile identification number (MIN) of each mobile who may possibly be a visitor within the exchange. The function of each of the subscriber interrogation points is to simply receive a data message from a visited exchange, for example, in the format of a standard SS7 message, and forward that message on to the intended SIP, home exchange or HLR recipient. In such a case, the subscriber interrogation point will receive the location update request message, consisting of a routing label and an information block, and examine the destination point code (DPC) and the originating point code (OPC) thereof. The subscriber interrogation point then replaces its own identification in the destination point code with the code of either the home exchange or HLR associated with the MIN data within the message block or a further subscriber interrogation point address code according to the way in which the network is arranged. The message is then rerouted to its new destination.

Figure 3:
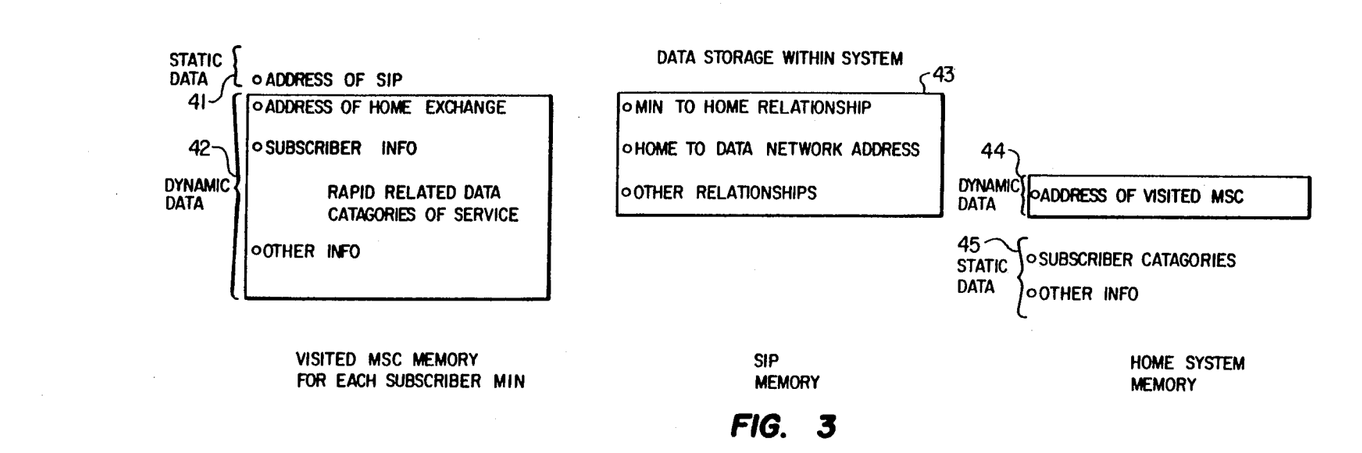
FIG. 3 is a chart illustrating storage of various items of information within the system of the present invention.

Referring next to FIG. 3, there is shown a layout of the data storage arrangement within the system of the present invention. Referring first to the left-most block of FIG. 3, there is shown the arrangement of information within the memory of the visited MSC. These data are associated with each MIN operating within the network and can be divided into two parts: static data 41, which is fixed within the memory; and dynamic data 42, which is supplied to the visited MSC by the home MSC of the visiting subscriber having that MIN. First, the static data 41 comprises an SIP address located in the digit analysis table of each exchange which associates an SIP address with each potentially visiting subscriber within the network. The other portion of the information 42 stored in the memory of the visited MSC and associated with each subscriber MIN includes the address of the home exchange of the subscriber; subscriber information such as radio related data (paging areas, location areas, etc.) and categories of service (whether the mobile is allowed to make long distance calls, special equipment such as voice privacy equipment, etc.); and other information related to the subscriber. When the visited MSC first receives a registration or call initiation request from a visiting mobile and locates the SIP address corresponding to the MIN of the mobile requesting service within its static data 41, a record is seized within the visited MSC memory within which to write the dynamic data 42 upon receipt of that information from the visiting mobile's home exchange.

In the central portion of FIG. 3, there is shown the static data which is stored within the memory of the SIP. In this memory, again associated with a particular MIN identification for each subscriber whose home exchange is associated with that SIP, are several pieces of information. The information comprises the MIN to home exchange relationship; the home exchange to data network address; and other relationships. The MIN to home exchange relationship is the destination address which is needed to get the update request message sent by the visited MSC back to the home exchange or home location register. The home to data network address may consist of a subsequent SIP address with which the home location register of the particular subscriber identified by that MIN is further associated.

Referring now to the right hand side of FIG. 3, there is shown the division of information within the home system memory, again corresponding to a dynamic data portion 44 and a static data portion 45 within the home location register memory. The dynamic data portion 44 consists of the address of the visited MSC which the home location register will store in response to the receipt of a data message from the visited MSC. The static data, the data which is returned to the visited MSC in reply to the request by the visited MSC, comprises the subscriber category associated with that particular roaming subscriber, including things such as whether or not the mobile is authorized to make long distance calls from a roaming location and whether or not certain special equipment is involved such as privacy features and the like. In addition, other information is stored there and might include things such as current billing information on the mobile which may be of interest to the visited exchange.

Figure 4:
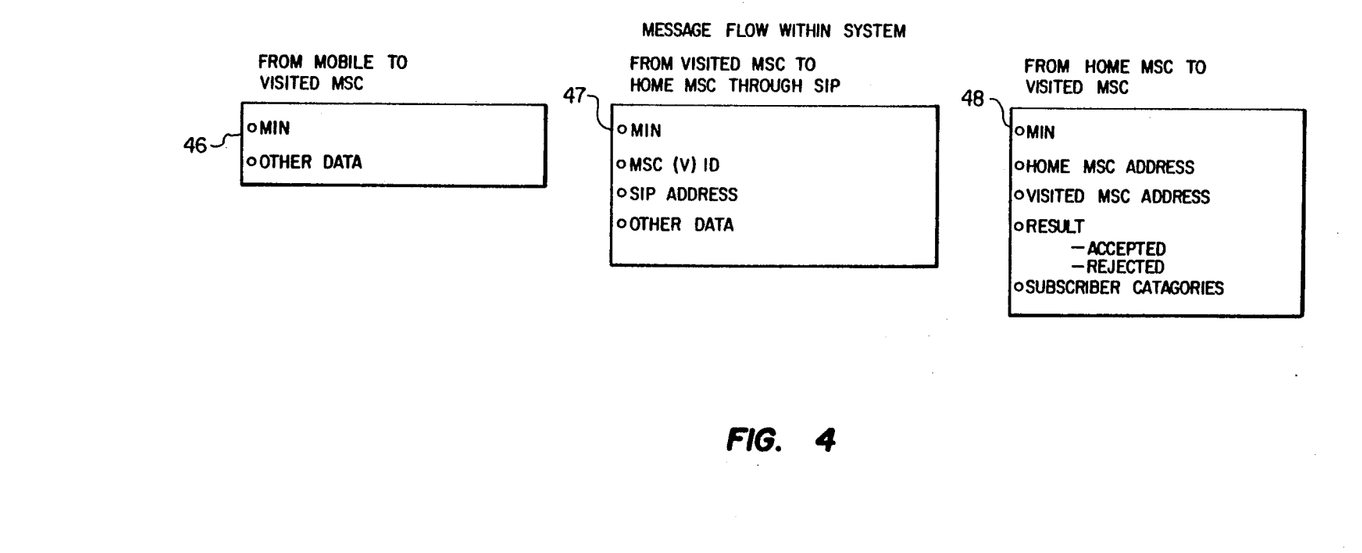
FIG. 4 is a chart illustrating an exemplary flow of messages within the system of the present invention.

Referring next to FIG. 4, there is shown a series of three diagrams illustrating the message flow within the system of the present invention. Referring first to the left-most portion of FIG. 4, there is shown a list of the messages 46 sent from the mobile to the visited MSC which include the MIN number of the mobile, and other data such as the electronic serial number (ESN) of that particular mobile. Next, in the central portion of FIG. 4, there is shown the messages 47 which are sent from the visited MSC to the home MSC via the subscriber interrogation point (SIP). These include the MIN of the mobile requesting registration, the visited MSC ID (which may be in the form of the origination point of the routing label in the message), the SIP address to which the message is directed, which may be the destination point code (DPC) of the routing label, and other data including specific information related to the particular call.

Referring to the far right hand side of FIG. 4, there is shown a list of the data 48 which are sent from the home MSC to the visited MSC once the request therefrom is received. These datas include the MIN of the mobile requesting registration, the home MSC address (which may take the form of the OPC of the routing label), the visited MSC address (which may take the form of the DPC of the routing label), the result of the analysis of the verification request (i.e., either accepted or rejected), and the subscriber categories of the particular mobile requesting registration. As pointed out above, the data information in block 48 sent from the home MSC to the visited MSC is sent directly via the data network rather than through the subscriber interrogation point by which the request came from the visited exchange to the home exchange. Once the home exchange has been identified to the visited exchange, all further communication occurs directly between the home and visited exchanges via the data network and the subscriber interrogation point is out of the loop.

Figures 5A, 5B, 5C:
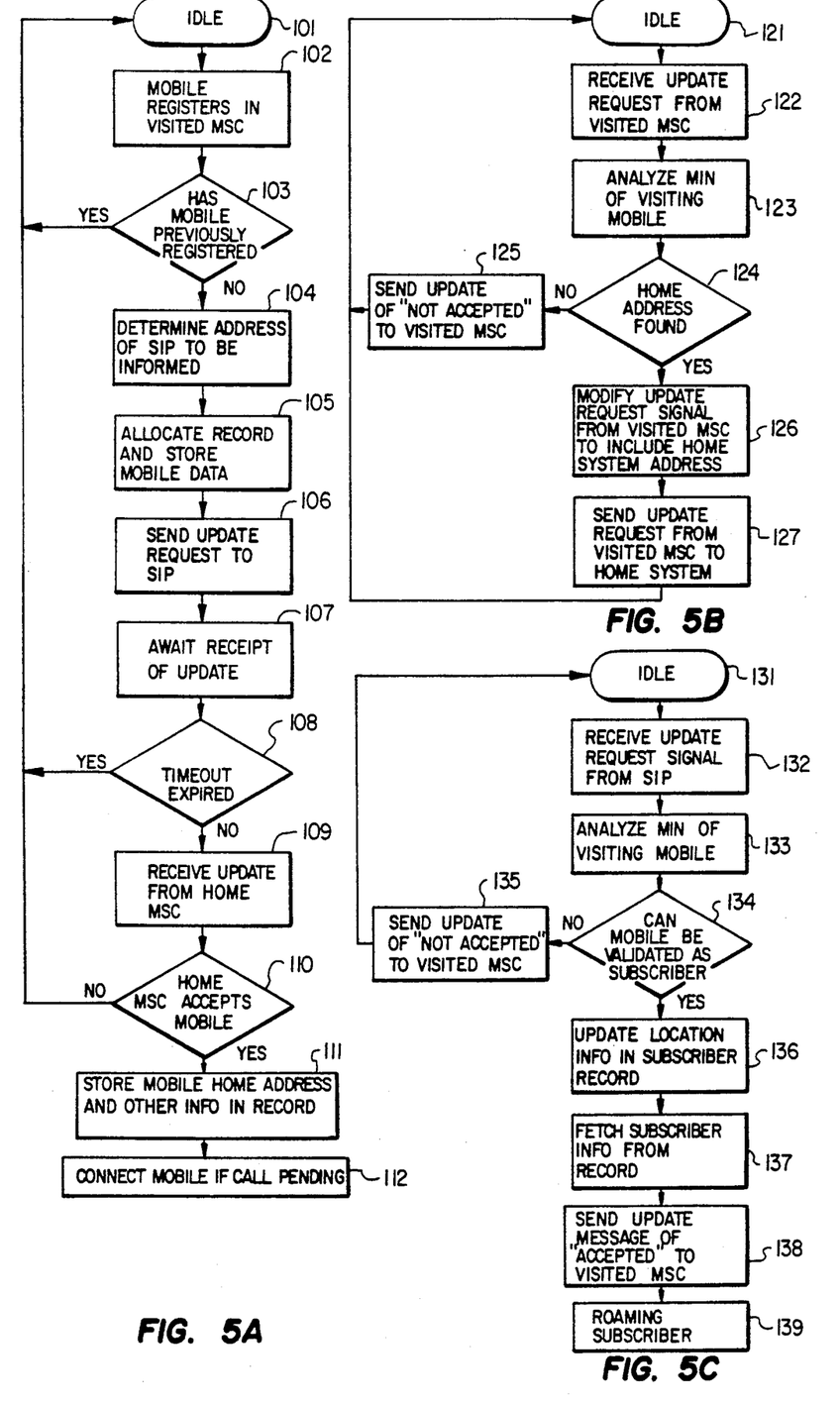
FIG. 5A is a flow diagram illustrating the handling of information by a visited exchange for a visiting mobile seeking to register in that exchange in accordance with the system of the present invention.
FIG. 5B is a flow diagram illustrating the handling of information within a subscriber interrogation point in accordance with the system of the present invention.
FIG. 5C is a flow diagram illustrating the handling of information within a home exchange in response to an authentication request from a visited exchange in accordance with the system of the present invention.

Referring next to FIG. 5A, there is there shown a flow diagram illustrating the sequence of steps which illustrate the tasks of the visited MSC in the process of receiving a registration request from a visiting mobile and obtaining verification/authentication of that mobile so as to allow it access to the visited exchange. First, the system moves from idle state at 101 to step 102 at which the mobile requests registration in the visited MSC. Next, at 103, the system evaluates whether the mobile has previously registered and, if so, returns to the idle state at 101. If not, the system moves to 104 where it determines the address of the SIP to be informed and from which information regarding the mobile is to be requested. Next, at 105, the system allocates a record corresponding to the MIN of the mobile requesting registration and a record is allocated to store data with regard to that particular mobile. At 106, the visited MSC sends a location update request to the SIP address determined in 104 and then enters a wait state at 107 to await the receipt of the update information corresponding to that mobile. If the information is not received and a time out expires at 108, then the mobile requesting service is released from the system and it returns to an idle state at 101. If the time out is not expired and the system receives at 109 the update from the home MSC, the system determines at 110 whether the home MSC has accepted the mobile. If not, the mobile is again released and the system returns to the idle state at 101. If the home MSC accepts the mobile, then at 111, the visiting MSC stores the mobile home address and other information in the record allocated at 105. If the mobile was requesting service as it registered at step 102, then the mobile is connected at 112 as long as the information received from the home exchange would allow the call pending by the mobile.

Referring next to FIG. 5B, there is shown the sequence of steps which occur within the subscriber interrogation point as it moves from the idle state at 121 to receive at 122 a location update request from a visited MSC. The system analyzes at 123 the MIN of the visiting mobile identified within the updating request and determines at 124 whether or not the home address of that mobile is found within the memory of the SIP. If not, the SIP sends at 125 an update message to the requesting visited mobile exchange of "not accepted" and advises that visited exchange to discontinue the communication with the mobile. If, however, at 124, the system determines that the home address of the mobile is found in the subscriber interrogation point memory, the system moves at 126 to modify the update request signal from the visited MSC to include the home system address. This may include either another subscriber interrogation point address or the address of the home HLR or home exchange of the mobile associated with the MIN. At 127, the subscriber interrogation point sends the update request from the visited MSC on to the home system address and removes itself from the loop. As can be seen from FIG. 5B, the subscriber interrogation point finishes its responsibility once it has sent the update request from the visited MSC on to the home system address. It is thereafter up to the home system to either respond to the update request by the visited MSC by either accepting or rejecting the mobile or to simply fail to reply due to an inability to locate the mobile within its memory.

Referring next to FIG. 5C, there is shown a flow chart of the sequence of operation within the home exchange and/or home location register. From the idle state at 131, the system moves to 132 at which it receives the location update request signal forwarded by the SIP from the visited exchange. At 133, the system analyzes the MIN of the visiting mobile requesting registration from the visited exchange and determines at 134 whether or not the mobile can be validated as a subscriber of the home exchange performing the analysis. If the mobile cannot be validated at 134, a message is sent at 135 to the visited MSC of "not accepted" communicating that the visiting mobile requesting registration cannot be accepted as being an verified mobile by that particular home exchange. If instead the mobile can be validated as a subscriber at 134, the system moves to 136 at which the information in the subscriber record of the home exchange is updated to identify the visited MSC within which the mobile is currently located. Next, at 137, the system fetches the subscriber information from the record stored within the home exchange or HLR and at 138 the system sends an update message of "accepted" to the visited MSC. This message tells the visited MSC that the subscriber seeking registration with the visited MSC is acceptable to the home MSC and that service should be accorded that mobile. In addition, at 138, the additional information related to the subscriber categories and other information corresponding to the particular mobile requesting service is also sent to the visited MSC so that the information will be present in the visited MSC record to appropriately serve the needs of the visiting mobile. Finally, at 139, the roaming subscriber is fully registered within the visited MSC and receives the appropriate service therefrom in accordance with the subscriber categories and other information corresponding to the mobile now stored in the visited MSC. As can be seen, the information transmitted at step 138 is sent directly to the visited MSC via the data communication network with no further involvement of the subscriber interrogation point.

In addition, the updated information within the home exchange of the mobile will allow calls to be forwarded from the home exchange directly to the mobile at the visited exchange once the address of the visited MSC is stored within the memory of the home exchange in accordance with these procedures.

Once the home exchange sends information directly to the visited MSC accepting the mobile subscriber requesting registration and forwarding the subscriber category information to the visited MSC, that information remains within the memory of the visited MSC in association with the MIN of the roaming subscriber until it is removed from that record in accordance with the procedures of the individual visited MSC. That is, that information may be retained for a predetermined time period allowing the mobile to continue to have immediate direct access to the visited MSC or it may be purged out of the visited MSC's memory in the event the visited MSC is not called upon to handle any traffic by the roaming subscriber within a preselected time period. Such handling of the information related to the visited subscriber may be dealt with within the individual switch in accordance with local options implemented by each individual operator of a visited exchange.

As can be seen from the above description of the system of the present invention, the use of subscriber interrogation points as data directing nodes within a mobile system network, enables a great improvement in the handling of home exchange/home location register information within each exchange comprising the network. That is, rather than requiring that a home address be associated with each MIN within the digit analysis table of every exchange of that network, only a subscriber interrogation point address needs to be included within that table. Thereafter, movement and change of an individual home exchange and/or home location register of that particular mobile, still associated with the same subscriber interrogation point, is unnecessary. All that will be necessary upon the changing of the individual subscriber home location identification is to change the stored information within the subscriber interrogation point corresponding to a plurality of home exchanges. This greatly simplifies the maintenance of information within the mobile system network lowering cost of maintenance as well as enhancing the speed and reliability within which subscriber information may be handled.

While it is believed that the operation and construction of the system of the present invention will be apparent from the foregoing description, the method of operation and structure of the system shown and described has been characterized as being preferred and obvious changes and modifications may be made therein without departing from the spirit and scope of the invention as defined in the following claims.

What is claimed is:

1. In a cellular radio communications network including a plurality of mobile switching centers each having a plurality of base stations with which a mobile subscriber identified by a mobile identification number can be connected,
   a plurality of mobile switching centers which serve as the home exchange for a plurality of mobile subscribers and store within a memory of each, preselected information associated with each mobile subscriber for which it is the home exchange;
   a plurality of mobile switching centers which can serve as the visited exchange for a plurality of mobile subscribers for which each is not the home exchange thereof and store within the memory of each preselected information associated with each mobile subscriber within the network capable of roaming into said visited exchange;
   a data network interconnecting each of said mobile switching centers for the communication of information therebetween; and
   a subscriber interrogation point connected to the data network for communications therewith and being associated with either other subscriber interrogation points or a group of mobile subscribers the home exchanges of which are located in a particular geographic area, said subscriber interrogation point having a memory containing information associated with a mobile identification number corresponding to each mobile subscriber in said group identifying either the home exchange of that particular subscriber or other subscriber interrogation points able to identify such home exchange; and,
   means for storing in the memory of each of said plurality of mobile switching centers which can serve as a visited exchange, information associated with the mobile identification number of each mobile subscriber in the network which identifies a subscriber interrogation point with which that mobile station is associated and not its home exchange so that when the home exchange of a mobile station is changed that information need only be modified in the memory of the mobile station's associated subscriber interrogation point and not in the memory of each visited exchange into which it can roam.

2. In a cellular radio communications network including a plurality of mobile switching centers each having a plurality of base stations with which a mobile subscriber can be connected as set forth in claim 1 which also includes:
   means, within each mobile switching center which can serve as a visited exchange and responsive to a request for registration by a visiting mobile subscriber, for sending a location update request message addressed to the subscriber interrogation point associated with the visiting mobile subscriber;
   means, within each subscriber interrogation point and responsive to the receipt of a location update request message from a visited exchange, for retrieving from memory the address of the home exchange of the visiting mobile subscriber identified in said location update request message; and
   means within each subscriber interrogation point for forwarding said location update request message to said address of the home exchange of said visiting mobile subscriber.

3. In a cellular radio communications network including a plurality of mobile switching centers each having a plurality of base stations with which a mobile subscriber can be connected as set forth in claim 1 which also includes:
   means, within each mobile switching center which can serve as a visited exchange and responsive to a request for registration by a visiting mobile subscriber, for sending a location update request message addressed to the subscriber interrogation point associated with the visiting mobile subscriber;
   means, within each subscriber interrogation point and responsive to the receipt of a location update request message from a visited exchange, for retrieving from memory the address of another subscriber interrogation point which contains the address of the home exchange of the visiting mobile subscriber identified in said location update request message; and
   means within each subscriber interrogation point for forwarding said location update request message to said address of the other subscriber interrogation point.

4. In a cellular radio communications network including a plurality of mobile switching centers each having a plurality of base stations with which a mobile subscriber can be connected as set forth in claim 2 in which said forwarding means includes:
   means for substituting the address of the home exchange of the visiting subscriber for the address of the subscriber interrogation point within the location update message request received by the subscriber interrogation point.

5. In a cellular radio communications network including a plurality of mobile switching centers each having a plurality of base stations with which a mobile subscriber may be connected as set forth in claim 3 in which said forwarding means includes:
   means for substituting the address of a subsequent subscriber interrogation point containing the address of the home exchange of the visiting mobile subscriber for the address of the subscriber interrogation point within the location update request message received by the subscriber interrogation point.

6. In a cellular radio communications network including a plurality of mobile switching centers each having a plurality of base stations with which a mobile subscriber may be connected as set forth in claim 2 which:
said group of mobile subscribers associated with said subscriber interrogation point are divided into subgroups each of which is associated with an additional subscriber interrogation point which stores in memory the home exchange of its associated mobile subscribers; and
said subscriber interrogation point memory stores the address of the one of said additional subscriber interrogation points which is associated with each subscriber rather than the home exchange address thereof.

7. In a cellular radio communications network including a plurality of mobile switching centers each having a plurality of base stations with which a mobile subscriber may be connected as set forth in claim 2 which also includes:
means within the home exchange of a visiting mobile subscriber and responsive to the receipt of a location update request message identifying one of its home subscribers for retrieving preselected information stored in memory related to said subscriber; and
means for communicating via said data network said preselected information to the visited exchange which sent the location update message request.

8. In a cellular radio communications network including a plurality of mobile switching centers each having a plurality of base stations with which a mobile subscriber may be connected as set forth in claim 7 which also includes:
means within the home exchange of said visiting mobile for storing in memory the address of the visited exchange which sent the location update request message.

9. In a cellular radio communications network including a plurality of mobile switching centers each having a plurality of base stations with which a mobile subscriber may be connected as set forth in claim 7 in which:
said preselected information retrieved from memory of said home exchange of said visiting mobile includes the service parameters of said mobile.

10. In a cellular radio communications network including a plurality of mobile switching centers each having a plurality of base stations with which a mobile subscriber may be connected as set forth in claim 7 which also includes:
means within said visited exchange for storing in memory said preselected information received from the home exchange of said visiting mobile.

11. In a cellular radio communications network including a plurality of mobile switching centers each having a plurality of base stations with which a mobile subscriber can be connected as set forth in claim 2 which also includes:
means within the home exchange of a visiting mobile subscriber and responsive to the receipt of a location update request message which does not identify one of its home subscribers for communicating via said data network a not accepted message to the visited exchange which sent the location update message request.

12. A method of supplying information to a visited exchange within a mobile radio communications network associated with a mobile subscriber roaming within said network and which is identified by a mobile identification number, said method comprising the steps of:
storing within a home location associated with each mobile subscriber, data associated with the mobile identification number of each mobile subscriber and related to the service of said subscriber and the last known geographic location of said subscriber;
storing within a subscriber interrogation point, data related to the identity of the home location of a plurality of mobile subscribers;
storing within each exchange in said network, data which identifies a subscriber interrogation point associated with the mobile identification number of each mobile subscriber within said network and not an identification of the home exchange of said subscriber so that when the home exchange of a mobile subscriber is changed that information need only be modified in the memory of the mobile subscriber's associated subscriber interrogation point and not in the memory of each visited exchange into which it can roam;
sending, from a visited exchange in response to a registration request by a visiting mobile subscriber, a location update request message addressed to the subscriber interrogation point associated with the mobile identification number of said visiting mobile requesting registration;
forwarding said location update request message from said subscriber interrogation point to the home location associated with the visiting mobile subscriber requesting registration with the visited exchange.

13. A method of supplying information to a visited exchange within a mobile radio communications network associated with a mobile subscriber roaming within said network as set forth in claim 12, which also includes the step of:
sending, from a home location in response to the receipt of said location update request message from said visited exchange, a message to said visited exchange either accepting or rejecting said visiting mobile subscriber.

14. A method of supplying information to a visited exchange within a mobile radio communications network associated with a mobile subscriber roaming within said network as set forth in claim 13, which also includes the step of:
sending, along with an acceptance message to said visited exchange, data related to the service of said visiting subscriber; and
storing in the home location of the visiting subscriber the address of the visited exchange.

15. A method of supplying information to a visited exchange within a mobile radio communications network associated with a mobile subscriber roaming within said network as set forth in claim 12 in which said location update request message addressed to the subscriber interrogation point associated with said visiting mobile includes an origination point code, a destination point code and a message block and in which said step of forwarding said location update request message from said subscriber interrogation point to the home location comprises the steps of:

changing the destination point code of said location update request message from that of the subscriber interrogation point receiving the message to that of the home location associated with said visiting mobile; and forwarding said location update request message from said subscriber interrogation point to said home location.

16. A method of supplying information to a visited exchange within a mobile radio communications network associated with a mobile subscriber roaming within said network as set forth in claim 15 in which the message block of said location update request message includes the address of said home exchange.

17. An improved cellular radio communications network of the type which includes a plurality of mobile switching centers each having a plurality of base stations with which a mobile subscriber can be connected, a plurality of mobile switching centers which serve as the home exchange for a plurality of mobile subscribers and store within a memory of each preselected information associated with the mobile identification number of each mobile subscriber for which it is the home exchange, a plurality of mobile switching centers which can serve as the visited exchange for a plurality of mobile subscribers for which each is not the home exchange thereof and store within the memory of each preselected information associated with the mobile identification number of each mobile subscriber within the network capable of roaming into said visited exchange, and a data network interconnecting each of said mobile switching centers for the communications of information therebetween, said improvement comprising:

a subscriber interrogation point connected to the data network for communications therewith and being associated with a group of mobile subscribers the home of exchanges of which are located in a particular geographic area, said subscriber interrogation point having a memory containing information associated with the mobile identification number of each mobile subscriber in said group identifying either the home exchange of that particular subscriber or the identification of another subscriber interrogation point which contains such a home exchange identification; and means for storing within the memory of each of said plurality of mobile switching centers which can serve as the visited exchange for a plurality of mobile subscribers for which each is not the home exchange thereof information associated with the mobile identification number of each mobile subscriber within the network capable of roaming into said visited exchange, said information identifying the subscriber interrogation point associated with said mobile subscriber and not the home exchange of said subscriber so that when the home exchange of a mobile subscriber is changed that information need only be modified in the memory of the mobile subscriber's associated subscriber interrogation point and not in the memory of each visited exchange into which it can roam.

18. An improved cellular radio communications network including a plurality of mobile switching centers each having a plurality of base stations with which a mobile subscriber can be connected as set forth in claim 17 which also includes:

means, within each subscriber interrogation point and responsive to the receipt of a location update request message from a visited exchange addressed to the subscriber interrogation point associated with a visiting mobile subscriber seeking registration within a visited exchange, for retrieving from memory the address of the home exchange of the visiting mobile subscriber identified in said update request message; and means also within each subscriber interrogation point for forwarding said update request message to said address of the home exchange of said visiting mobile subscriber.

19. An improved cellular radio communications network including a plurality of mobile switching centers each having a plurality of base stations with which a mobile subscriber can be connected as set forth in claim 18 in which said forwarding means includes:

means for substituting the address of the home exchange of the visiting mobile subscriber for the address of the subscriber interrogation point within the update request message received by the subscriber interrogation point.

20. An improved cellular radio communications network including a plurality of mobile switching centers each having a plurality of base stations with which a mobile subscriber can be connected as set forth in claim 17 which also includes:

means, within each subscriber interrogation point and responsive to the receipt of a location update request message from a visited exchange addressed to the subscriber interrogation point associated with a visiting mobile subscriber seeking registration within a visted exchange, for retrieving from memory the address of another subscriber interrogation point containing the address of the home exchange of the visiting mobile subscriber identified in said update request message; and means also within each subscriber interrogation point for forwarding said location update request message to said address of the other subscriber interrogation point.

21. An improved cellular ratio communications network including a plurality of mobile switching centers each having a plurality of base stations with which a mobile subscriber may be connected as set forth in claim 20 in which said forwarding means includes:

means for substituting the address of the subsequent subscriber interrogation point containing the adresses of the home exchange of the visiting mobile subscriber for the address of the subscriber interrogation point within the location update request message received by the subscriber interrogation point.

* * * * *

UNITED STATES PATENT AND TRADEMARK OFFICE
CERTIFICATE OF CORRECTION

PATENT NO. : 5,210,787
DATED : May 11, 1993
INVENTOR(S) : John Hayes et al.

It is certified that error appears in the above-indentified patent and that said Letters Patent is hereby corrected as shown below:

| | |
|---|---|
| Column 4, line 39 | Replace "loction" With --location-- |
| Column 4, line 64 | Replace "poont" With --point-- |
| Column 7, line 19 | Replace the first occurrence of "the" With --that-- |
| Column 13, line 6 | Replace "may" With --can-- |
| Column 13, line 21 | Replace "may" With --can-- |
| Column 13, line 35 | Replace "may" With --can-- |
| Column 13, line 44 | Replace "may" With --can-- |
| Column 13, line 52 | Replace "may" With --can-- |
| Column 16, line 41 | Replace "visted" With --visited-- |

UNITED STATES PATENT AND TRADEMARK OFFICE
CERTIFICATE OF CORRECTION

PATENT NO. : 5,210,787
DATED : May 11, 1993
INVENTOR(S) : John Hayes et al.

It is certified that error appears in the above-indentified patent and that said Letters Patent is hereby corrected as shown below:

Column 16, line 50     Replace "ratio"
                           With --radio--

Column 16, line 53     Replace "may"
                           With --can--

Signed and Sealed this

Second Day of July, 1996

Attest:

BRUCE LEHMAN

Attesting Officer    Commissioner of Patents and Trademarks